United States Patent [19]

Smith

[11] 4,425,042

[45] Jan. 10, 1984

[54] POSITIONING MEASURING APPARATUS AND METHOD

[75] Inventor: Rex L. Smith, Horseheads, N.Y.

[73] Assignee: Corning Glass Works, Corning, N.Y.

[21] Appl. No.: 281,317

[22] Filed: Jul. 8, 1981

[51] Int. Cl.³ .................. G01B 11/00; G01B 11/14; G01B 11/08

[52] U.S. Cl. .................. 356/375; 250/578; 356/387; 356/390

[58] Field of Search .......... 356/375, 379–380, 356/384, 386–387, 390; 250/561, 578

[56] References Cited

U.S. PATENT DOCUMENTS

| | | | |
|---|---|---|---|
| 3,874,798 | 4/1975 | Antonsson et al. | 356/386 |
| 4,201,476 | 5/1980 | Musto et al. | 356/386 |

FOREIGN PATENT DOCUMENTS

| | | | |
|---|---|---|---|
| 2448651 | 4/1975 | Fed. Rep. of Germany | 356/384 |
| 54-130954 | 10/1979 | Japan | 250/578 |

OTHER PUBLICATIONS

Khoury, H. A., "Linear Photodiode Feedback Automatic Alignment System", IBM Tech. Disc. Bull. 3/75, pp. 2887–2889.

Rycroft, R. J., "A Non–Contacting Width Monitor & A Position Sensitive Photocell", Colloquium on Optical Techniques for Measurement in Control, London, England, Oct. 26, 1970, pp. 5/1-4.

Gusev, Y. A., "Method & Circuit for Finding the Coordinate of the Center of a Particle Track on a Scanning Automation", Instruments & Experimental Techniques, Nov.-Dec. 1975, pp. 1761-1763.

Primary Examiner—William H. Punter
Attorney, Agent, or Firm—W. J. Simmons, Jr.

[57] ABSTRACT

A portion of a collimated light beam is directed at an article, and the resultant shadow-containing beam is reflected by a mirror onto a linear photodiode array. A second portion of the collimated beam is initially reflected by the mirror toward the article. The resultant shadow-containing beam impinges upon a second portion of the diode array. The positions of the two shadows on the array are indicative of the X and Y positions of the article. The scanned output from the array is processed to generate two binary signals representative of the X and Y positions.

6 Claims, 9 Drawing Figures

POSITIONING MEASURING APPARATUS AND METHOD

BACKGROUND OF THE INVENTION

This invention relates to an apparatus and method for detecting the position of an article such as, for example, an optical waveguide fiber. More particularly, this invention relates to a simplified and compact apparatus for optically determining the X and Y positions of a fiber coupled with a circuit for providing output signals indicative of such X and Y positions. The output signals may be employed to control a feedback operation such as the positioning of the fiber relative to a coater.

Glass optical waveguide fibers must exhibit high strength in order to withstand the stresses which are encountered during incorporation into protective sheathing or cable, installing the cable, or during use thereof. While such fibers are typically quite strong as drawn from a preform, crucible, or the like, this strength is rapidly degraded by surface defects which are introduced into the fiber through handling or otherwise.

To preserve the strength of a newly drawn fiber it is conventional to apply to the fiber, immediately after it is drawn, a thin protective coating composed of an organic or inorganic coating material which serves to protect the fiber during subsequent handling. Typical fiber coating apparatus is disclosed in U.S. Pat. Nos. 4,194,462 and 4,264,649. Both of these patents teach the use of an X-Y positioner to position the coater with respect to the fiber so that the fiber is substantially centered in the coating die. Such positioning prevents the uncoated fiber from being damaged by contacting the coating apparatus and ensures the application of substantially concentric coatings. Various means have been employed to determine the position of a fiber within the coating apparatus. The aforementioned U.S. Pat. No. 4,264,649 teaches the use of a television camera which is directed toward the output orifice of the coating apparatus so that the position of the fiber therein can be observed on a monitor. Another method for determining fiber position employs two sources of collimated light directed orthogonally onto the fiber. The light beams from the two sources are then directed onto two detectors, which may comprise scanned diode arrays. The outputs from the arrays may be connected to electronic circuits which drive digital displays that read out the X and Y positions of the fiber. An operator can observe the position of the fiber by reading the displays and can then manually adjust either the coater position or the fiber source to center the fiber in the coating apparatus. Alternatively, the outputs from the scanned diode arrays may be connected to X and Y positioning motors which automatically perform such fiber centering functions.

SUMMARY OF THE INVENTION

It is an object of the present invention to provide a simplified method and apparatus for determining the position of an article.

Briefly, the present invention pertains to an apparatus for detecting the position of an article. The apparatus comprises a scanning light sensor having first and second portions. First and second collimated light beams impinge on the article, thereby casting first and second shadows on the first and second sensor portions, respectively. The positions of the shadows sensed by the first and second portions of the light sensor are indicative of the positions of the article in first and second directions. Means are provided for utilizing the output of the scanning light sensor.

In a preferred embodiment, a reflective surface is located near the article. Means is provided for directing a collimated light beam onto the article so that a first portion of the beam impinges on the article, thereby casting a shadow on the reflective surface, the balance of the first portion of the beam being reflected from the reflective surface to the first portion of the sensor. A second portion of the beam is directed to the reflective surface and reflected therefrom at the article in a direction substantially perpendicular to the first portion of the light, thereby casting a shadow of the article on the second portion of the light sensor.

DESCRIPTION OF THE PREFERRED EMBODIMENT

Figures 1, 2:
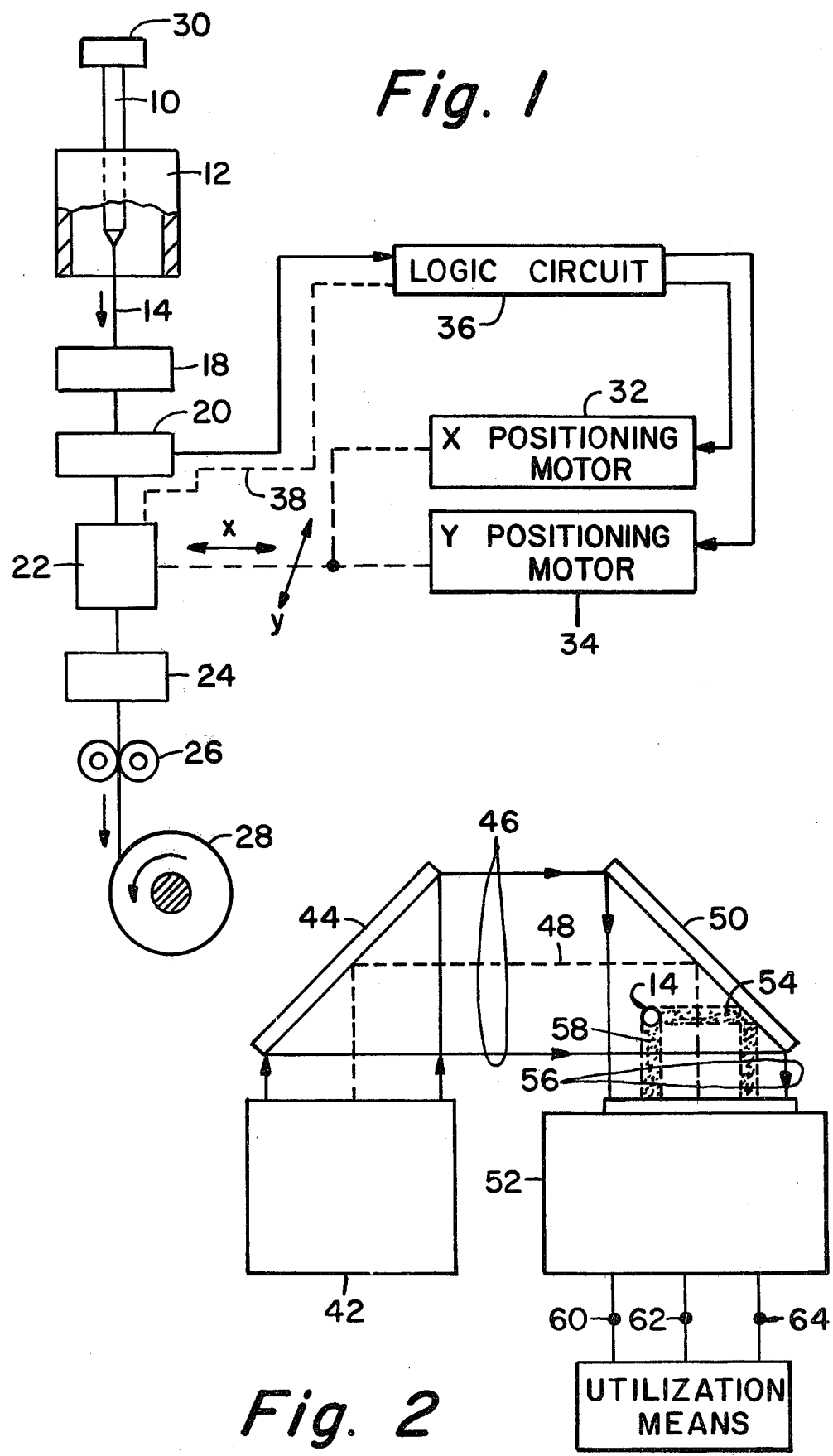
FIG. 1 is a schematic illustration showing certain equipment and circuitry for use in detecting the position of an optical waveguide fiber and for centering the fiber in a coating apparatus.
FIG. 2 is a schematic illustration of a preferred embodiment of the optical system of the present invention.

FIG. 1 illustrates a glass optical waveguide fiber drawing system wherein waveguide blank 10 is at least partially surrounded by a furnace 12. A fiber 14 drawn from blank 10 traverses diameter-measuring apparatus 18, position-measuring apparatus 20, coating apparatus 22, and dryer 24. A tractor assembly, including belts or rollers 26 grips the fiber and provides the pulling force for drawing the latter from blank 10. Finally, the finished fiber is wound upon a take-up reel 28.

Blank 10 may be of any appropriate form, although it is commonly in the shape of an elongate cylinder. Alternatively, a blank may be a tube or have various other cross-sectional forms. Blank 10 is conventionally gripped by appropriate moveable means 30 which feed the blank into furnace 12 at a predetermined rate. Moveable means 30 can also be employed to appropriately position blank 10 in the plane perpendicular to fiber 14. Within the furnace, the leading edge of the blank is softened so that it may be drawn into a small diameter fiber. Various process parameters, including temperature, blank size and draw speed may be varied in order to precisely control the size of the drawn fiber. Instantaneous control of fiber diameter is conventionally effected by varying the speed of tractors 26 in accordance with the output signal from diameter-measuring apparatus 18.

Coating assembly 22 comprises orifices through which the waveguide fiber 14 passes. During its passage through the coating apparatus, the fiber is surrounded by a fluid coating material. In order to position the orifice concentrically with fiber 14, a locating apparatus such as commercially-available X-Y positioning motors 32 and 34, respectively, may be used. The output signal from position-measuring apparatus 20 may be coupled to a logic circuit 36, the output signals of which are connected to X and Y positioning motors 32 and 34 to position the coating orifice concentrically with fiber 14. Dashed line 38 is illustrative of the fact that logic circuit 36 is provided with an input which is indicative of the X and Y positions of the coating orifice.

Of course, other appropriate locating means may be selected for centering the coating orifice concentrically with respect to fiber 14. For example, the X and Y positioning motors may be connected to blank supporting means 30 in order to physically move the position of fiber 14 while maintaining coater 22 stationary. The output from position measuring apparatus 20 may also be connected to electronic circuits which drive digital displays that provide X and Y position readouts. An operator reading such displays can manually adjust either the position of coater 22 or of blank support means 30, either of which may be mounted upon commercially-available, manual X-Y positioners or slides.

Figure 3:
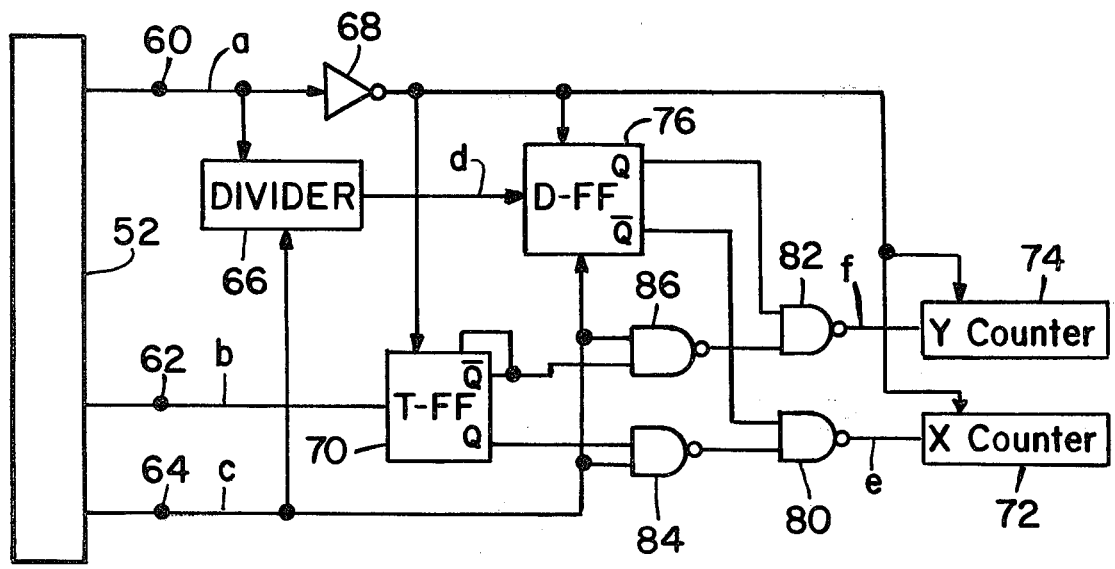
FIG. 3 is a schematic illustration in block diagram form of a circuit for processing signals generated by the apparatus of FIG. 2.

In FIGS. 2 and 3 there is shown a presently preferred embodiment of position measuring apparatus 20. As shown in FIG. 2, a collimated light beam from a source 42 impinges upon mirror 44, the reflected collimated beam 46 being directed toward fiber 14. The center of beam 46 in a plane perpendicular to the axis of fiber 14 is represented by dashed line 48. Beam 46 is directed toward fiber 14 in such a manner that the fiber is located near the midpoint of one-half of the light beam. Beam 46 is reflected by mirror 50 onto the light sensing portion of a reticon camera 52 containing a photodiode array and its associated electronics. The output of the camera is a sampled and held analog voltage. A commercially-available model LC 100S1024 reticon camera employs a diode array containing 1024 elements on 1 mil centers. It is a self-scanning array with a serial output. Each silicon photodiode has an associated storage capacitor and a multiplexing switch for periodic readout via an integrated shift register scanning circuit. Fiber 14 should be positioned with respect to light beam 46 such that it is in the path of that half of light beam 46 which reflects from that portion of mirror 50 which is nearest to camera 52. After impinging upon fiber 14, light beam 46 contains a shadow 54, which shadow is maintained in light beam 56 which reflects from mirror 50. As beam 56 impinges upon fiber 14, a second shadow 58 is formed. In the arrangement described, the two shadows 54 and 58 will be contained in the respective portions of light beam 56 which impinge upon each half of the photosensitive portion of camera 52. Three output terminals 60, 62 and 64 may be connected to any suitable utilization means.

Figure 4:
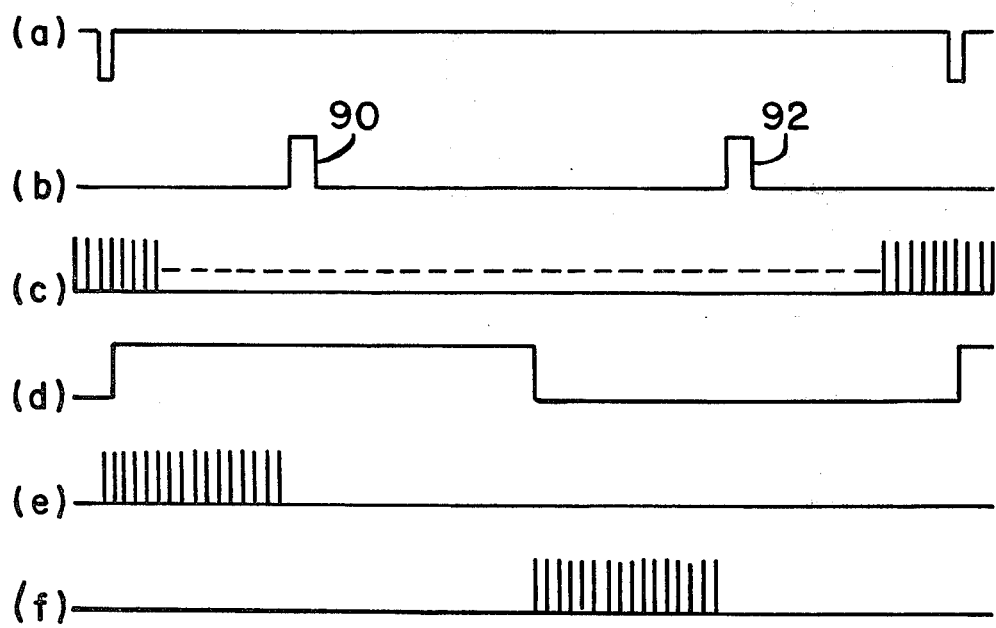
FIGS. 4a–4f are waveforms of voltages appearing at various points in the circuit of FIG. 3.

FIG. 3 illustrates a suitable circuit for processing the camera output signals to provide an indication of the position of shadows 54 and 58 on the two halves of the photosensitive input of camera 52. Enable pulses, X and Y position video data pulses and clock pulses appear at output terminals 60, 62 and 64, respectively, of camera 52. These pulses are illustrated in FIGS. 4a, 4b and 4c, respectively. The enable pulse is connected directly to divider 66 and is connected by way of inverter 68 to T flip-flop 70, D flip-flop 76 and binary counters 72 and 74 to reset the complete system at the end of the scan of the photodiodes. Since camera 52 comprises a linear array of 1024 photosensitive diodes, a complete scan of the array will occur during 1024 clock pulses. If such a camera is employed, the output polarity of divider 66 switches to a low level upon receipt of 512 clock pulses after being reset by the enable pulse.

When flip-flop 76 is reset, the $\overline{Q}$ output is high, thus enabling NAND gate 80. The output of divider 66 is connected to flip-flop 76. After the divider output changes state, the next clock pulse applied to flip-flop 76 changes the state thereof, thereby enabling NAND gate 82 and disabling NAND gate 80.

When flip-flop 70 is reset, the Q output is high, thereby enabling NAND gate 84 and disabling NAND gate 86. Thus, after the trailing edge of the enable pulse, clock pulses begin to flow into X counter 72 through NAND gates 84 and 80. These clock pulses are counted until the X position pulse 90 appearing at the video data terminal 62 causes flip-flop 70 to change states. At that time, the Q output of flip-flop 70 goes low, thereby disabling NAND gate 84 so that no additional clock pulses can be transmitted to the X counter. The total number of clock pulses transmitted to counter 72 prior to the occurrence of X position pulse 90 is illustrated in FIG. 4e.

At this time, the X counter contains the number of counts which is indicative of the X position of fiber 14. This count may be employed to drive a digital readout device or to input a logic circuit, the output of which may be employed to drive X positioning motor 32 of FIG. 1.

At the time that flip-flop 70 disables gate 84, it enables NAND gate 86, but no clock pulses are counted by Y counter 74 since NAND gate 82 remains disabled. After the occurrence of 512 clock pulses following reset by the enable pulse, the output of divider 66 goes low as illustrated by FIG. 4d, thereby causing flip-flop 76 to change state. The Q output of flip-flop 76 goes high and enables NAND gate 82. Since both gates 82 and 86 are simultaneously enabled, clock pulses will be transmitted through these gates to Y counter 74. The clock pulses will be counted by counter 74 until the Y position pulse 92 on the video data line causes flip-flop 70 to change states and disable NAND gate 86. At that time, the Y position of fiber 14 can be displayed or can be employed to control Y positioning motor 34 of FIG. 1. After the entire photodiode array has been scanned, another enable pulse appears at terminal 60 to reset the system.

That portion of the circuit of FIG. 3 to the right of terminals 60, 62 and 64 can be considered to be utilization means connected to the camera. Such utilization means comprises circuit means for processing the first and second pulses appearing at terminal 62. In response to the first and second pulses, the circuit means generates first and second binary signals at the outputs of counters 72 and 74 which are indicative of the times of generation of the first and second video pulses.

We claim:
1. An apparatus for detecting the position of an article comprising:
 a camera having a linear photodiode array, a source of clock pulses, means responsive to said clock pulses for scanning said array to produce video data output pulses indicative of shadows in a light beam impinging upon said array, and means for producing an end of scan pulse,
 means for directing a first collimated light beam onto said article so that said first beam having a first shadow of said article impinges upon a first portion of said photodiode array,
 means for directing a second collimated light beam onto said article so that said second beam having a second shadow of said article impinges upon a second portion of said photodiode array, the posi- tions of said first and second shadows on said array being indicative of the position of said article in first and second directions, respectively, first and second pulse counter circuits, first and second gate means having an input terminal connected to said source of clock pulses, third gate means connecting the output of said first gate means to said first counter, fourth gate means connecting the output of said second gate means to said second counter, a first flip-flop having first and second complimentary output terminals connected to said first and second gate means, respectively, for alternately enabling said first and second gate means, a second flip-flop having first and second complimentary output terminals connected to said third and fourth gate means, respectively, for alternately enabling said third and fourth gate means, a pulse train divider circuit, the output of which is connected to an input of said second flip-flop, means connecting said end of scan pulse to the reset inputs of said first and second flip-flops, said divider and said first and second pulse counter circuits, and means connecting said video output data pulses to said first flip-flop.

2. An apparatus for detecting the position of an article comprising:

a line scanning camera comprising a linear array of photodiodes, said array having first and second portions, said camera generating an enable pulse at the end of each scan of said photodiode array, a reflective surface, means for directing a collimated light beam toward said article so that a first portion of said beam impinges on said article, thereby casting a first shadow on said reflective surface with the balance of said first portion of the beam being reflected from said reflective surface to said first portion of said array, the position of said first shadow as sensed by said camera being indicative of the position of said article in a first direction, a second portion of said beam being directed to said reflective surface and reflected therefrom toward said article in a direction substantially perpendicular to said first portion of said beam, thereby casting a second shadow of said article on said second portion of said array, the position of said second shadow as sensed by said camera being indicative of the position of said article in a direction substantially perpendicular to said first direction, said camera providing first and second serial video output pulses during each scan, the time of generation of said first and second video pulses being indicative of the position of said first and second shadows on said array, a source of clock pulses, first and second pulse counters, first and second gate means connecting said clock pulse source to said first and second counters, respectively, means responsive to said clock pulses and to said enable pulse for generating a divider pulse at the midpoint of each scan of said linear diode array, gate control means responsive to said divider pulse and to said video pulses for enabling said first gate means only during that period of time between the generation of said enable pulse and the generation of said first video pulse, and for enabling said second gate means only during that period of time between the generation of said divider pulse and the generation of said second video pulse, whereby said first and second counters generate first and second binary signals, respectively, which are indicative of the time of generation of said first and second video pulses.

3. The apparatus of claim 2 further comprising article modifying means adjacent said article, and means responsive to the outputs from said first and second counters for moving said article modifying means relative to said article.

4. The apparatus of claim 3 wherein said article modifying means comprises means for applying a coating to said article.

5. An apparatus for detecting the position of a fiber comprising:

a line scanning camera comprising a linear array of photodiodes, said array having first and second portions, said camera generating an enable pulse at the end of each scan of said photodiode array, means for directing a first collimated light beam onto said fiber and thereafter onto said first portion of said array thereby illuminating those photodiodes of said first portion except for the photodiodes upon which a first shadow of said fiber is cast, the position of said first shadow as sensed by said camera being indicative of the position of said fiber in a first direction, means for directing a second collimated light beam onto said fiber and thereafter onto said second portion of said array thereby illuminating those photodiodes of said second portion except for the photodiodes upon which a second shadow of said fiber is cast, the position of said second shadow as sensed by said camera being indicative of the position of said fiber in a direction substantially perpendicular to said first direction, said camera providing first and second video output pulses during each scan, the time of generation of said first and second video pulses being indicative of the position of said first and second shadows on said array a source of clock pulses, first and second pulse counters, first and second gate means connecting said clock pulse source to said first and second counters, respectively, means responsive to said clock pulses and to said enable pulse for generating a divider pulse at the midpoint of each scan of said linear diode array, and gate control means responsive to said divider pulse and to said video pulses for enabling said first gate means only during that period of time between the generation of said enable pulse and the generation of said first video pulse, and for enabling said second gate means only during that period of time between the generation of said divider pulse and the generation of said second video pulse, whereby said first and second counters generate first and second binary signals, respectively, which are indicative of the time of generation of said first and second video pulses.

6. The apparatus of claim 5 further comprising means for pulling said fiber along a linear path, means situated between said means for pulling and said camera for applying a coating to said fiber, and means responsive to the outputs of said first and second counters for moving said coating means relative to said fiber.

* * * * *